United States Patent
Simon et al.

(10) Patent No.: US 7,484,362 B2
(45) Date of Patent: Feb. 3, 2009

(54) DECOUPLING HOSE FOR A MOTOR VEHICLE EXHAUST SYSTEM

(75) Inventors: Jean-Michel Simon, Chatillon (FR); Claire Girot, Ballancourt (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 11/249,412

(22) Filed: Oct. 14, 2005

(65) Prior Publication Data
US 2006/0032218 A1 Feb. 16, 2006

Related U.S. Application Data

(62) Division of application No. 10/704,812, filed on Nov. 12, 2003, now Pat. No. 6,996,977.

(30) Foreign Application Priority Data
Nov. 28, 2002 (FR) ................................... 02 14958

(51) Int. Cl.
F01N 7/00 (2006.01)

(52) U.S. Cl. ............................. 60/322; 60/272; 60/274; 60/323; 285/49; 285/53; 285/300

(58) Field of Classification Search .................. 60/272, 60/282, 320, 322, 323, 274; 285/49, 53, 285/266, 299, 300
See application file for complete search history.

(56) References Cited

U.S. PATENT DOCUMENTS

| | | | | |
|---|---|---|---|---|
| 3,369,829 A | * | 2/1968 | Hopkins | ...................... 285/227 |
| 3,844,587 A | | 10/1974 | Fuhrmann et al. | |
| 3,997,194 A | * | 12/1976 | Eifer et al. | ...................... 285/53 |
| 4,345,430 A | | 8/1982 | Pallo et al. | |
| 5,167,430 A | * | 12/1992 | Bainbridge | ................... 285/53 |
| 5,346,263 A | * | 9/1994 | Huzenlaub et al. | ............ 285/53 |
| 5,904,378 A | | 5/1999 | Bakker et al. | |
| 6,296,282 B1 | * | 10/2001 | Burkhardt et al. | .............. 285/49 |
| 6,554,321 B1 | * | 4/2003 | Boisseau et al. | ............... 285/49 |
| 6,996,977 B2 | * | 2/2006 | Simon et al. | .................... 60/322 |

FOREIGN PATENT DOCUMENTS

| | | |
|---|---|---|
| DE | 19603594 | 8/1997 |
| EP | 282689 | 9/1988 |
| EP | 458011 | 11/1991 |
| FR | 2796416 | 4/2003 |

* cited by examiner

*Primary Examiner*—Binh Q. Tran
(74) *Attorney, Agent, or Firm*—Clark & Brody

(57) ABSTRACT

A method of avoiding damage to a decoupling hose mounted between two tubes of a motor vehicle exhaust system, said hose comprising a deformable inner portion, an outer sealing leakproofing portion in the form of a continuous and leaktight sleeve having a flexible central zone and two rigid endpieces, and an intermediate portion in the form of a wad of thermal lagging extending substantially over the entire length of the outer sleeve, each rigid endpiece extending at least over a length such that its peripheral end edge connected to the flexible central zone overlies the inner portion of the hose which is subjected to deformation, wherein, in order to avoid any damage to the wad of thermal lagging by said peripheral end edge of each endpiece, the method consists in defining the effective length of the endpieces in such a manner that for the wad of thermal lagging having an initial thickness $H_0$ and a compressed thickness $H_c$ when compressed by said peripheral edge of each endpiece during maximum transverse deflection in operation of the inner portion of the hose, the ratio $[H_0-H_c]/H_0$ is less than 0.3.

7 Claims, 3 Drawing Sheets

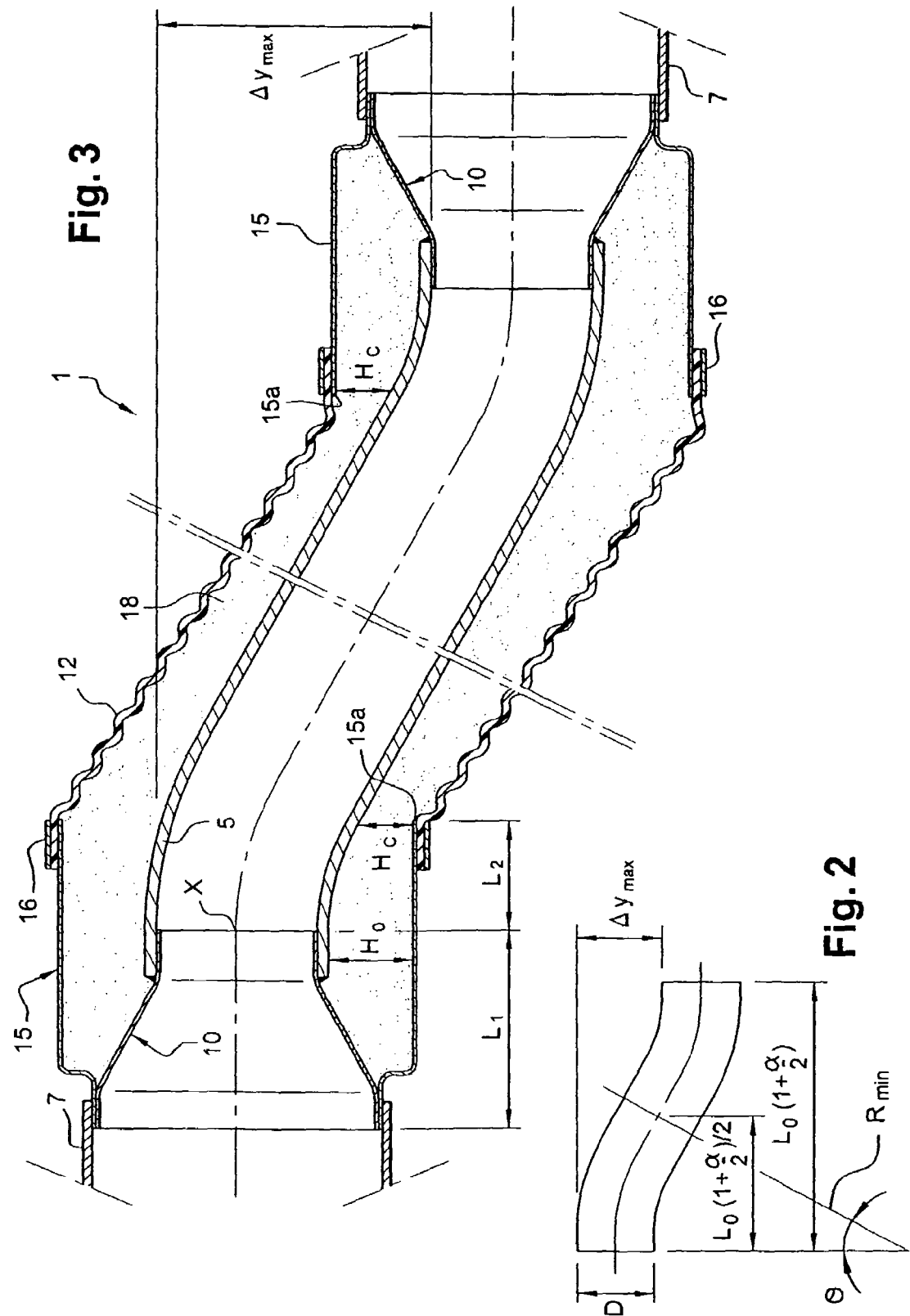

DECOUPLING HOSE FOR A MOTOR
VEHICLE EXHAUST SYSTEM

CROSS-REFERENCE TO RELATED
APPLICATIONS

This application is a division of U.S. application Ser. No. 10/704,812 filed Nov. 12, 2003, now U.S. Pat. No. 6,996,977 which claims priority of French Application No. 0214958 filed Nov. 28, 2002.

The invention relates to an improvement to a decoupling hose for insertion in a motor vehicle exhaust system.

BACKGROUND OF THE INVENTION

In general, a motor vehicle exhaust system is mounted at the outlet of an exhaust manifold of the engine and is suspended from the body of the vehicle. The presence of a decoupling hose enables the exhaust system to accommodate movements of the engine associated with vertical accelerations, sudden changes in speed, thermal expansion, assembly tolerances, . . . , and provides the flexibility needed to decouple engine vibrations from the exhaust line and from the body, thereby improving comfort within the vehicle cabin.

Document FR-A-2 796 416 discloses a decoupling hose which comprises, in particular, an inner portion suitable for channeling the flow of exhaust gases, an outer portion in the form of a continuous leaktight sleeve having a flexible central zone and two rigid endpieces, and an intermediate portion in the form of thermal lagging which extends substantially over the full length of the outer sleeve. The two metal endpieces serve essentially to protect the flexible central zone of the outer sleeve of the hose from high temperatures by keeping said central zone as far as possible away from hot zones where the hose is connected to the exhaust system.

Furthermore, any hose mounted on a vehicle is subjected to deformation in several directions and in particular to transverse displacements in shear which can reach amplitudes of ±50 millimeters (mm) on large vehicles. During endurance tests performed on a hose of the above-specified type, the Applicant has found that the thermal lagging becomes damaged by each endpiece in the vicinity of its peripheral end edge that is connected to the central zone of the outer sleeve. During large-amplitude movements in shear, the lagging is locally compressed and said end peripheral edges of the endpieces then cut into the lagging in the compressed zone.

When testing on vehicles fitted with hoses of a length lying in the range 150 mm to 200 mm, maximum amplitudes of movements in shear have been found of the order of ±15 mm to ±20 mm, and after running 10,000 kilometers (km) the above-mentioned wear phenomenon can be observed. Furthermore, simulation bench tests consisting in imposing shear strains to the hose with amplitudes of ±12 mm in combination with traction and compression strains of the order of 3 mm have led to the above-mentioned wear phenomenon being observed after 500,000 cycles.

Analysis of those various tests has shown that the lagging becomes worn as a result of the inner portion of the hose deforming over a length that is longer than the length of the flexible central zone of its outer sleeve.

OBJECTS AND SUMMARY OF THE
INVENTION

An object of the invention is specifically to mitigate this wear phenomenon, either by defining the effective length of the endpieces to take account of the thickness of the wad of lagging which is compressed by the endpieces during deformation of the inner portion of the hose so as to define a maximum length for the endpieces, given that the endpieces of the outer sleeve must extend over a length that is sufficient to perform their primary function of thermally protecting the flexible central zone of the outer sleeve, or else by limiting or preventing compression of the wad of lagging by the endpieces during deformation of the inner portion of the hose so as to avoid being subject to a constraint concerning the length of the endpieces.

To this end, in a first approach to the problem to be solved, the invention provides a method of avoiding damage to a decoupling hose mounted between two tubes in a motor vehicle exhaust system, the hose comprising a deformable inner portion which is suitable for channeling the flow of exhaust gases and for being subjected in operation to deformations such as transverse deflections in shear, an outer portion in the form of a continuous leaktight sleeve having a flexible central zone and two rigid endpieces, and an intermediate portion in the form of a wad of thermal lagging which extends substantially over the entire length of the outer sleeve, each rigid endpiece extending at least over a length such that its peripheral end edge connected to the flexible central zone is situated in register with the inner portion of the hose which is subjected to deformations, wherein, in order to avoid any damage to the wad of thermal lagging by the peripheral end edge of each endpiece during transverse deflections in shear of the inner portion of the hose, the method consists in defining the effective length of the endpieces in such a manner that, for an initial thickness $H_0$ of the wad of thermal lagging and for a compressed thickness $H_c$ of said wad when compressed by said peripheral edge of each endpiece during maximum transverse deflection in operation of the inner portion of the hose, the ratio $[H_0-H_c]/H_0$ is less than 0.3.

In a variant, in a second approach to the problem to be solved, in order to avoid any damage to the wad of thermal lagging by the peripheral end edge of each endpiece during transverse deflections in shear of the inner portion of the hose, the method consists in adapting the shape of each endpiece and/or the initial thickness $H_0$ of the wad of thermal lagging in such a manner that said peripheral end edge of each endpiece makes practically no contact with the wad of thermal lagging during maximum transverse deflection in operation of the inner portion of the hose.

The two above-specified approaches for solving the problem posed by the invention thus relates to the same general inventive concept.

The invention also provides a decoupling hose for a motor vehicle exhaust system, which hose is made by implementing the method as defined above.

BRIEF DESCRIPTION OF THE DRAWINGS

Other advantages, characteristics, and details of the invention appear from the additional description given below with reference to the accompanying drawings which are given purely by way of example, and in which:

FIG. 2 is a diagrammatic section view for illustrating the deformation of the FIG. 1 hose when it is subjected to maximum transverse deflection;

FIG. 3 shows the FIG. 1 decoupling hose when it is subjected to deflection in shear.

MORE DETAILED DESCRIPTION

A decoupling hose of the invention is for mounting between two pipes in a motor vehicle exhaust system and it comprises overall a deformable inner portion suitable for channeling the flow of exhaust gases and for deforming when the hose is in service or in operation, an outer portion in the form of a continuous sleeve that is leaktight and flexible at least in part in order to allow the inner portion to deform; and an intermediate portion in the form of a wad of thermal lagging interposed between the inner portion and the outer portion of the hose.

Figure 1:
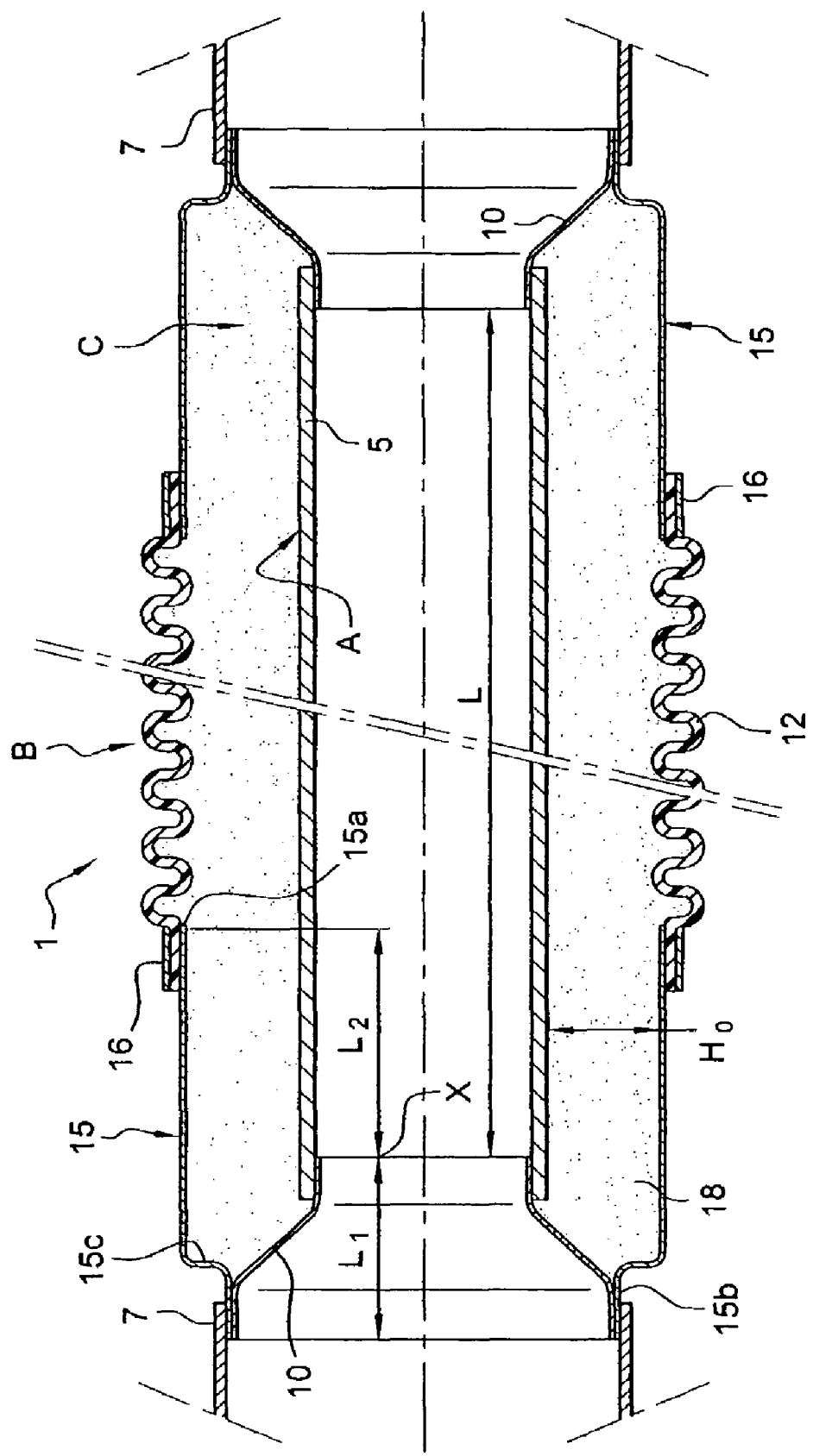
FIG. 1 is a longitudinal section view of a decoupling hose constituting an embodiment of the invention.

With reference to a decoupling hose as shown in FIG. 1, the inner portion A of the hose 1 is constituted by a deformable tubular metal element 5 which, by way of example, may be in the form of a tube held together by a folded seam joint, advantageously a very loose joint with two folded seams. Each end of the tubular element 5 is connected to a tube 7 in the exhaust system by a metal link piece 10 which may be welded to the element 5 and/or to the tube 7, it being understood that the tubular element 5 and the two link pieces 10 may possibly be constituted as a single piece. The outer portion B of the hose 1 forms a sleeve which comprises two rigid end zones themselves constituted by metal endpieces 15, and at least one flexible central zone 12 of a material which withstands high temperatures such as silicone and which may be constituted by a bellows. Each endpiece 15 is constituted by a tubular segment of inside diameter greater than the outside diameter of the coupling tubes 7. The end peripheral edge 15a of each endpiece 15 is connected to the flexible central zone 12 by means of a clamping collar 16, for example. Towards its other end, each endpiece 15 presents a reduction in diameter so as to form a coupling 15b which is secured to the coupling tube 7 by welding, an annular shoulder 15c thus being defined between the two diameters of each endpiece 15. The intermediate thermal lagging portion C is constituted by an annular wad 18 made of fibrous material, for example, and it penetrates into the insides of the endpieces 15. The wad of lagging 18 has an outside diameter which corresponds substantially to the inside diameter of the endpieces 15, and its two ends come into contact respectively with the two shoulders 15c of the two endpieces 15, i.e. the wad of lagging 18 extends over practically the entire length of the hose 1.

In general, and as mentioned in the introduction, the decoupling hose 1 is subjected to displacements or deformations in several directions, and in particular to transverse deflections in shear. Specifically, the tubular element 5 can deform only over a length L which corresponds to its total length minus the length needed for coupling at its two ends.

In general, each of the two endpieces 15 of the outer portion B of the hose 1 needs to extend over a length that is sufficient to provide thermal protection to the flexible central zone 15 of the outer sleeve by keeping it as far as away as possible from the hot zone constituted by the two tubes 7 for coupling the hose 1 to the exhaust system. Naturally, it is also necessary for the flexible central zone 15 of the outer sleeve of the hose 1 itself to extend over a length that is sufficient for the inner portion A of the hose 1 to be capable of deforming under the mechanical stresses to which the hose 1 is subjected in conditions of operation. Specifically, this means that the two peripheral end edges 15a of the two endpieces 15 which are connected to the flexible central zone 12 are situated in register with the deformable portion of length L of the inner tubular element 15 of the hose 1.

FIGS. 1 and 3 show a first approach of the invention for solving the problem of the wad of lagging 18 being damaged by the end peripheral edges 15a of the endpieces 15 during deformation of the hose 1. In this first approach, a solution is sought to define a maximum length of endpiece beyond which the compression to which the wad of lagging 18 is subjected is such as to run the risk of damaging it.

More precisely, the initial thickness of the wad of lagging 18 is written $H_0$ and is such that its outside diameter is substantially equal to the inside diameter of the endpieces 15, i.e. the wad of lagging 18 comes generally into contact with the endpieces 15 over the entire length thereof (FIG. 1).

When the hose 1, and in particular its inner tubular element 5, is subjected in operation to a maximum transverse deflection in shear, as shown in FIG. 3, the wad of lagging 18 is compressed to a thickness Hc by the peripheral end edges 15a of the endpieces 15. It should be observed this maximum transverse deflection in operation may be smaller than the maximum transverse deflection that can be taken up by the tubular element 5.

In this first approach, any damage to the wad of lagging 18 is avoided providing the ratio $[H_0-H_c]/H_c$ is less than 0.3.

Furthermore, it is also possible to convert this ratio into terms of maximum length for the endpieces 15. For this purpose, the length of each endpiece 15 must be subdivided into a first length $L_1$ going from its end connected to the coupling tube 7 to a point X situated in register with the beginning of the deformable length L of the inner portion A of the hose 1, and a second length $L_2$ going from said point X to the other end of the endpiece 15. In addition, the tubular element 5 is also characterized by its outside diameter D, its minimum radius of curvature $R_{min}$, and its deformable length L once mounted in the exhaust system.

Taking the example of a tubular element 5 in the form of a tube joined by folded seams, its radius of curvature $R_{min}$ is defined initially, from which the maximum value of the second length $L_2$ for each endpiece 15 can be deduced.

The radius of curvature $R_{min}$ is such that:

$$R_{min} = D \times \left(\frac{1}{\alpha} + \frac{1}{2}\right) \quad (1)$$

where $\alpha$ is the maximum elongation of the folded seam joined tube.

This minimum length of curvature $R_{min}$ corresponds to a maximum transverse deflection $\Delta_{ymax}$ for a compressed length $L_0$ of the tube, this deflection being obtained when the tube is stretched by $\alpha/2$, and shown diagrammatically in FIG. 2.

The following two equations can thus be deduced:

$$L_0(1+\alpha) = 2\left(R_{min} + \frac{D}{2}\right) \times \theta \quad (2)$$

$$\cos\theta = \frac{R_{min} - (\Delta_{ymax}/2)}{R_{min}} = 1 - \frac{\Delta_{ymax}}{2R_{min}} \quad (3)$$

From the above equations, it is possible to deduce a relationship between $R_{min}$ and $\Delta_{ymax}$ for a compressed length $L_0$ of the tube:

$$L_0(1+\alpha) = 2\left(R_{min} + \frac{D}{2}\right)arcos\left(1 - \frac{\Delta_{ymax}}{2R_{min}}\right)$$

In operation, the tube is characterized at any instant by its rest length L and by its transverse deflection $\Delta_y \leq \Delta_{ymax}$.

Under such conditions, the parameters L and $\Delta y$ define a radius of curvature R, but to ensure that the wad of lagging is not damaged, the first approach imposes the following condition:

$$\frac{1}{H_0}(H_0 - H_c) < 0.3$$

However, given that:

$$\left[\left(R - \frac{D}{2}\right) - (H_0 - H_c)\right]^2 + L_2^2 = \left(R - \frac{D}{2}\right)^2$$

it can be deduced that:

$$H_0 - H_c = \left(R - \frac{D}{2}\right) - \sqrt{\left(R - \frac{D}{2}\right)^2 - L_2^2}$$

and consequently the ratio $$\frac{1}{H_0}(H_0 - H_c) < 0.3$$

is equivalent to:

$$L_2max = \sqrt{0.3H_0(2R-D-0.3H_0)}$$

Furthermore, given that R is related to $\Delta y$ and $L_0$ by the equation:

$$R = \frac{\Delta y^2 + L^2}{4\Delta y}$$

it can be deduced that:

$$L_2max = \sqrt{0.3H_0\left(\frac{\Delta y^2 + L^2}{2\Delta y} - D - 0.3H_0\right)}$$

Thus, the length $L_2$ of each endpiece in register with the deformable portion of the inner portion A of the hose 1 must not extend beyond the above-specified value $L_2max$ in order to avoid any damage to the wad of lagging 18.

If this equation is applied to a hose 1 having the following characteristics: inner portion A in the form of a folded-seam tube with an outside diameter of about 40 mm, a rest length L lying in the range 75 mm to 165 mm, and capable of accepting a maximum transverse deflection of the order of 10 mm to 20 mm in operation, then the length $L_2max$ of each endpiece 15 lies in the following ranges:

25 mm<$L_2$max<50 mm for $H_0 \approx 10$ mm; and 25 mm<$L_2$max<70 mm for $H_0 \approx 20$ mm; and (where $H_0$ is the initial thickness of the wad of lagging 18).

If it is found that the imposed length $L_2max$ for each endpiece 15 is not sufficient to enable it to perform its temperature insulation function effectively for protecting the flexible central zone 12, then each endpiece 15 can be extended by at least one terminal segment, but without creating new compression zones in the wad of lagging 18.

Figure 4:
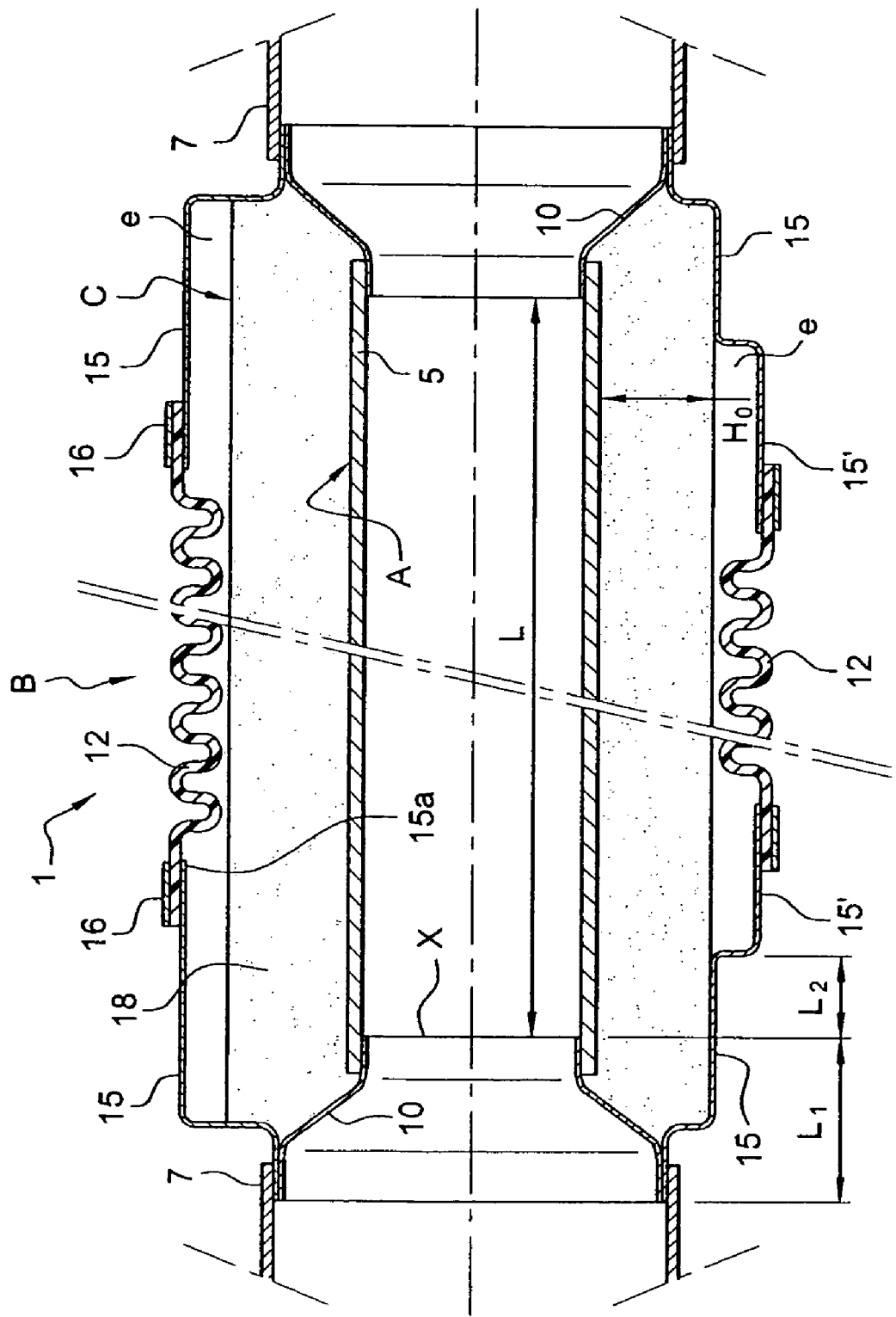
FIG. 4 is a longitudinal section view of a decoupling hose of the invention comprising top and bottom half-views for illustrating two other embodiments.

More precisely, in a second embodiment shown in the bottom half-section view of FIG. 4, each endpiece 15 is extended by a terminal segment 15' of greater diameter, thus giving each endpiece 15 a stepped shape, it being understood that the diameter of these segments 15' should not exceed the maximum diameter authorized for the hose. Sufficient empty space e is provided between the wad of lagging 18 and the peripheral end edges 15a of the terminal segments 15'. Thus, the second length $L_2$ of each endpiece can be given a value that is less than or equal to $L_2max$ and it can be extended by a terminal segment 15'.

When the flexible central zone 12 of the outer portion B of the hose 1 is in the form of a bellows, the connection between the endpieces 15 or their terminal segments 15' can advantageously be connected to the top of a corrugation of the bellows, as also shown in the bottom half-section view of FIG. 4, so as to reduce the overall size of the hose 1. Furthermore, from a thermal point of view, it is advantageous for the bottoms of the corrugations of the bellows to come into contact with the wad of lagging.

A second approach of the invention for solving the problem of the wad of lagging 18 being damaged by the end peripheral edges 15a of the endpieces 15 during deformation of the hose 1 consists in avoiding forming compression zones in the wad of lagging 18 using the end peripheral edges 15a of the endpieces 15.

It is possible to act on the shape of the endpieces 15 and/or on the thickness of the wad of lagging 18 given that from the thermal point of view it is preferable to restrict such actions to the shape of the endpieces 15.

Thus, in a third embodiment shown in the top half-section view of FIG. 4, the endpieces 15 are similar to those shown in FIG. 1 but their diameter has been increased to occupy the maximum authorized outside dimension without correspondingly changing the thickness of the wad of lagging 18, thereby creating at least one initial empty space e that is sufficiently large between the peripheral end edges 15a of the endpieces 15 and the wad of lagging 18. In a variant, it is possible to give each endpiece a stepped shape, extending it by at least one terminal segment 15' as in the second embodiment, so as to create, as before, at least one initial empty space e of sufficient size between the peripheral end edges 15a of the endpieces 15 and the wad of lagging 18. When the flexible central zone 12 of the outer sleeve is constituted by a bellows, each endpiece 15 or terminal segment 15' thereof is advantageously connected to the top of a corrugation of the bellows, with the bottoms of the corrugations of the bellows coming into contact with the wad of lagging 18.

What is claimed is:

1. A method of avoiding damage to a decoupling hose mounted between two tubes in a motor vehicle exhaust system, the hose comprising a deformable inner portion which is suitable for channeling the flow of exhaust gases and for being subjected in operation to deformations such as transverse deflections in shear, an outer portion in the form of a continuous leaktight sleeve having a flexible central zone and two rigid endpieces, and an intermediate portion in the form of a wad of thermal lagging which extends substantially over the entire length of the outer sleeve, each rigid endpiece extending at least over a length such that its peripheral end edge connected to the flexible central zone is situated in register with the inner portion of the hose which is subjected to deformations, wherein, in order to avoid any damage to the wad of thermal lagging by the peripheral end edge of each endpiece during transverse deflections in shear of the inner portion of the hose, the method comprising adapting the shape of each endpiece in such a manner that said peripheral end edge of each endpiece makes practically no contact with the wad of thermal lagging during maximum transverse deflection in operation of the inner portion of the hose.

2. A method according to claim 1 further comprising increasing the diameter of each endpiece to leave sufficient initial empty space between said peripheral end edges of the endpieces and the wad of lagging.

3. A method according to claim 1 further comprising giving each endpiece a stepped shape with at least one terminal segment of greater diameter leaving sufficient initial empty space between said peripheral end edges of the endpieces and the wad of lagging.

4. A method according to claim 1 further comprising making the flexible central zone of the outer sleeve in the form of a bellows and in connecting each endpiece to the top of a corrugation of the bellows.

5. A decoupling hose mounted between two tubes in a motor vehicle exhaust system, the hose comprising a deformable inner portion suitable for channeling the flow of exhaust gases and being subjected in operation to transverse deflection, an outer portion comprising a continuous leaktight sleeve having a flexible central zone and two rigid endpieces, and an intermediate portion comprising a wad of thermal lagging extending over substantially the entire length of the outer sleeve, each rigid endpiece extending at least over a length such that its peripheral end edge connected to the flexible central zone is situated in register with the inner portion of the hose which is subjected to deformations, wherein, in order to avoid damage to the wad of thermal lagging by the peripheral end edge of each endpiece during transverse deflections in shear of the inner portion of the hose, said peripheral end edge of each endpiece is spaced from said wad whereby it makes practically no contact with the wad of thermal lagging during maximum transverse deflection in operation of the inner portion of the hose.

6. A decoupling hose according to claim 5, wherein the deformable inner portion of the hose is formed by a metal tube formed by a loose folded-over seam joint.

7. A method of avoiding damage to a decoupling hose mounted between two tubes in a motor vehicle exhaust system, comprising providing a hose comprising a deformable inner portion which is suitable for channeling the flow of exhaust gases and for being subjected in operation to deformations such as transverse deflections in shear, an outer portion in the form of a continuous leaktight sleeve having a flexible central zone and two rigid endpieces, and an intermediate portion in the form of a wad of thermal lagging which extends substantially over the entire length of the outer sleeve, each rigid endpiece extending at least over a length such that its peripheral end edge connected to the flexible central zone is situated in register with the inner portion of the hose which is subjected to deformations, wherein, in order to avoid any damage to the wad of thermal lagging by the peripheral end edge of each endpiece during transverse deflections in shear of the inner portion of the hose, the method further comprising adapting the shape of each endpiece in such a manner that said peripheral end edge of each endpiece makes practically no contact with the wad of thermal lagging during maximum transverse deflection in operation of the inner portion of the hose.

* * * * *